United States Patent [19]

Terry et al.

[11] 3,861,711

[45] Jan. 21, 1975

[54] ENERGY ABSORBING CRASH PANEL

[75] Inventors: Samuel M. Terry; Walter V. Slominski, both of Ann Arbor, Mich.

[73] Assignee: Hoover Ball and Bearing Co., Saline, Mich.

[22] Filed: Nov. 27, 1972

[21] Appl. No.: 309,675

[52] U.S. Cl. ............................................. 280/150 B
[51] Int. Cl. ............................................. B60r 21/08
[58] Field of Search....... 280/150 B; 296/70; 180/90

[56] References Cited
UNITED STATES PATENTS

| | | | |
|---|---|---|---|
| 2,091,057 | 8/1937 | Straith | 280/150 B |
| 3,088,539 | 5/1963 | Mathues | 280/150 B |
| 3,774,713 | 11/1973 | Stegmaier | 280/150 B |

*Primary Examiner*—Robert R. Song
*Attorney, Agent, or Firm*—Olsen & Stephenson

[57] ABSTRACT

An impact energy absorbing panel assembly for mounting on the dashboard of an automobile to cushion the impact of an occupant of the automobile with the dashboard during a collision. The panel assembly has a skeletal frame with a foam body molded about the frame. The frame is constructed and mounted so as to absorb impact energy in a predetermined manner to minimize injury to the automobile's occupant.

5 Claims, 7 Drawing Figures

PATENTED JAN 21 1975

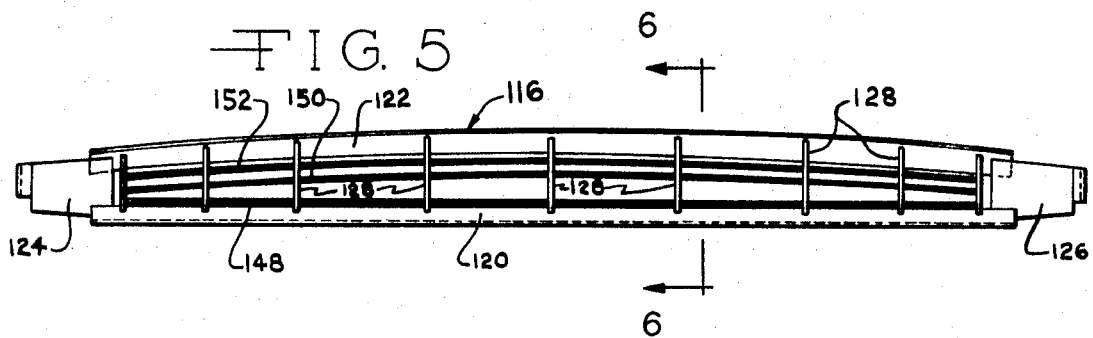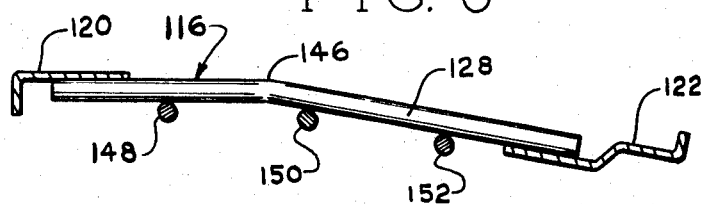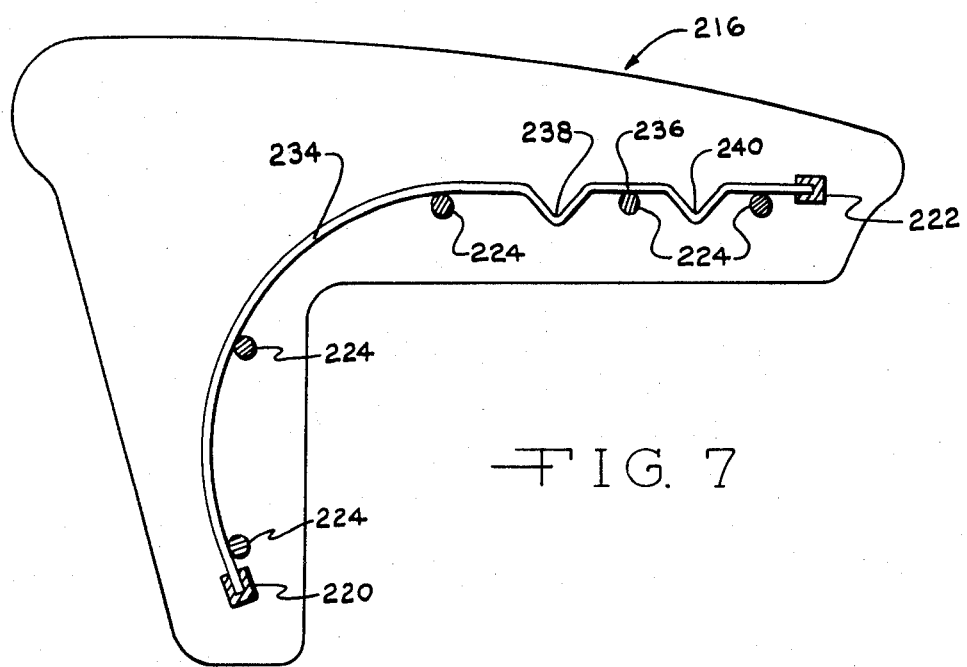

ENERGY ABSORBING CRASH PANEL

BACKGROUND OF THE INVENTION

With the increased emphasis on automobile safety, a padded dashboard became one of the early areas of concentration. A rigid dashboard provided an immediate hazard for an automobile occupant during a front end collision. Padded dashboards are known in the auto safety art, but present configurations fail to provide adequate protection for an occupant hurled against the dashboard. The early padded dashboards often were little more than a layer of foam over the original rigid dashboard. Once the limit of the elastic compression of the foam was reached the occupant came in contact with the rigid dashboard. Compression of the foam required little energy so that in high speed crashes a layer of foam alone was of little value. Later dashboard crash panels were constructed of fiberboard or cardboard material covered with foam. This provided more protection due to the added protection achieved when the cardboard crushed under impact. The problem existed in that uniformity of energy absorption was difficult to achieve.

SUMMARY OF THE INVENTION

The present invention provides a dashboard crash panel which provides elastic restraint over a wide range of momenta with predictable and preprogrammable results. The panel consists of a frame having two spaced lateral cross members extending the length of the dashboard and connected together at each end by end brackets. Intermediate transverse wire sections are attached to the lateral cross members and extend perpendicularly between the lateral members. The wire spring sections are slightly bent so that when the lateral members are forced together by impact, the wire sections bend upward. This bend can be pre-programmed for the momentum anticipated. One of the lateral members is attached to the dashboard while the other is supported by the wire sections. An intermediate bracket is provided to accommodate the assembly to the curvature of the dashboard.

In another embodiment of the present invention, lateral wires are incorporated to provide a secondary resistance element in addition to the transverse wires.

In another embodiment, the transverse wires are bowed between the lateral members and have crimped sections which can be pre-programmed to fold on impact against the bowed transverse wire section.

Thus, the objective of the present invention is to provide an energy absorbing crash panel for an automobile dashboard which can be constructed and programmed to absorb energy in a predetermined manner for anticipated momenta involved during an automobile collision.

Further objects, features and advantages of this invention will become apparent from a consideration of the following description, the appended claims, and the accompanying drawing in which:

BRIEF DESCRIPTION OF THE DRAWINGS

FIG. 5 is a top plan view of a second embodiment of the crash panel frame;

FIG. 6 is an enlarged sectional view of the crash panel as seen along line 6—6 of FIG. 5; and FIG. 7 is a cross sectional view of a third embodiment of the crash panel.

DESCRIPTION OF THE PREFERRED EMBODIMENTS.

Figure 1:
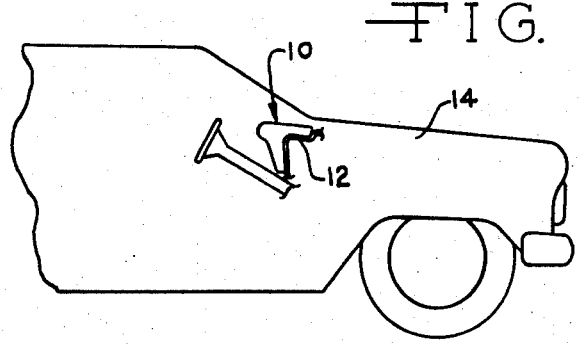
FIG. 1 is a side elevational view of the crash panel mounted within an automobile.

Referring to the drawings, a crash panel 10 is shown in FIG. 1 mounted on the dashboard 12 of an automobile 14. The crash panel 10 consists of a frame 16 (FIG. 2) and a foam body 18 (FIG. 3) molded onto the frame 16.

The frame 16 comprises two sheet metal members 20 and 22 which are spaced apart and are joined together at each end by end brackets 24 and 26. The spacing between members 20 and 22 is resiliently maintained by transverse wires 28, 30 and 32 attached to and extending between the members 20 and 22. Each wire, such as wire 30, has a bend 33 near its midpoint. The purpose of the bend will appear below as part of the discussion of the operation of the panel assembly 10.

Figure 3:
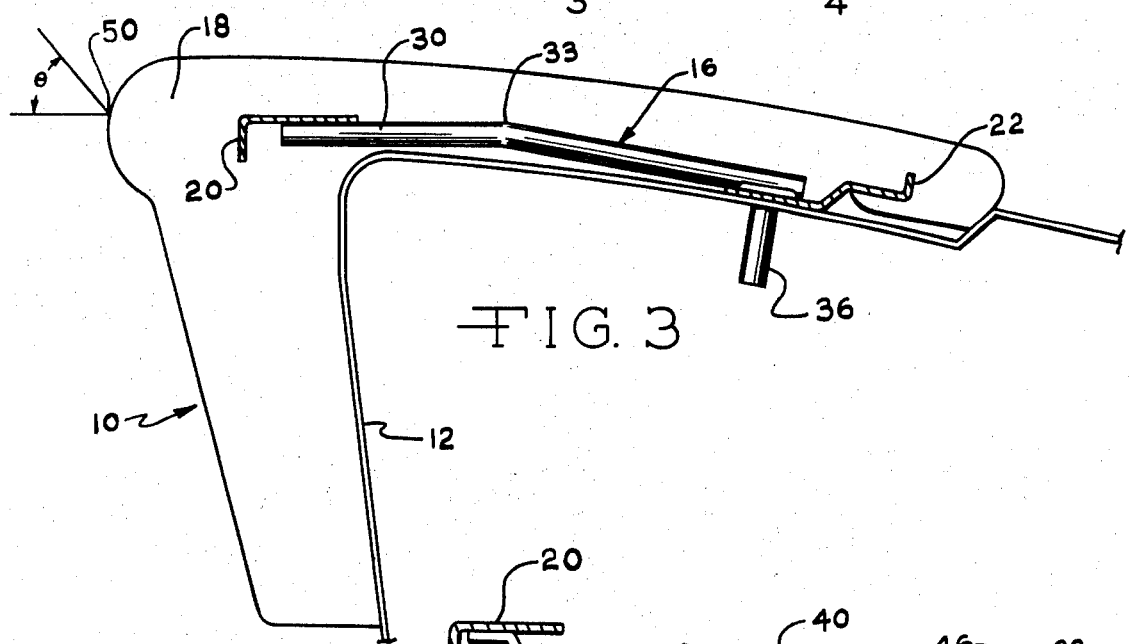
FIG. 3 is a cross sectional view of the crash panel as seen along line 3—3 of FIG. 2.
Figure 4:
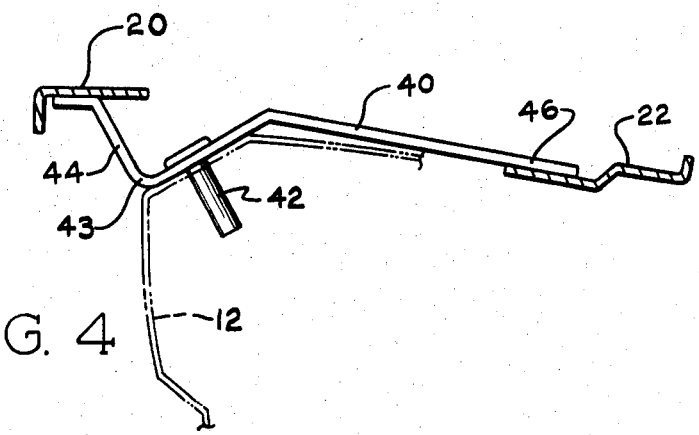
FIG. 4 is a cross sectional view of the crash panel as seen along line 4—4 of FIG. 2.

The frame 16 is mounted to the dashboard 12 by rigidly attaching member 22 to the dashboard 12 near its center 34 by means of rivets such as rivet 36 (FIG. 3) or by other suitable means. Brackets 38 and 40 (FIG. 2) are rigidly mounted on the dashboard 12 near end brackets 24 and 26, respectively. The bracket 40 (FIG. 4) is exemplary and is mounted to the dashboard 12 by means of rivet 42 or other suitable means. The bracket 40 has a bend 43 and an upward extending end portion 44 which supports the member 20 and a rearward extending end 46 under which member 22 is retained. The brackets 38 and 40 thus allow the frame 16 to be mounted on a dashboard 12 which slopes away from its center. The upward extending end portion 44 is also configured to bend rearward on impact against the member 20.

Figure 2:
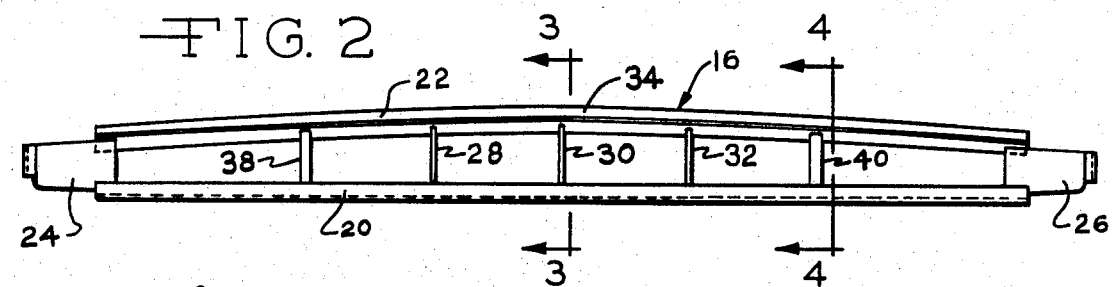
FIG. 2 is a top plan view of the frame of the crash panel with the foam body removed to shown internal detail.

In operation the occupant of the automobile would contact the crash panel 10 at a point 50 (FIG. 2). The expected angle of impact, $\theta$, would be, for example, approximately 49° above the horizontal as shown in FIG. 2. A small amount of the impact energy would be dissipated in compressing the foam body 18 against the floating forward member 20. The force exerted on the member 20 would be resolved into a horizontal and vertical component which would cause the wire 30 to flex at bend 33 and thus articulate the bend 33 upward while the member 20 moves downward and rearward. This flexing of wires 28, 30 and 32 dissipates further energy of the impact. Also as the member 20 moves rearwardly, the brackets 38 and 40 begin to bend at point 43 of bracket 40 and a similar point of bracket 38. This bending also absorbs energy.

The wires 28, 30 and 32 thus absorb most of the energy of impact. The bend 33 can be pre-programmed for expected momenta of impact, and the stiffness of the wire 30 can be preselected for given impact momenta.

Another embodiment of a crash panel frame 116 is shown in FIG. 5. The frame 116 has spaced frame members 120 and 122 connected at their ends by brackets 124 and 126. The members 120 and 122 are maintained spaced by transverse wires 128 attached to each member 120 and 122 and extending therebetween. Each wire 128 has a bend 146 near its midpoint. Additionally, the frame 116 has lateral wires 148, 150 and 152. The lateral wires are bowed up under the transverse wires 128 as shown in FIG. 6. These wires 148, 150 and 152 provide a secondary flexing component to back up the transverse wires.

Another embodiment of a crash panel frame 216 is shown in FIG. 7. This embodiment has spaced frame members 220 and 222 with a plurality of wire members 224 disposed parallel to and arranged between the frame members 220 and 222. The frame 216 employs a bowed transverse wire 234 attached to the frame members 220 and 222 and extending therebetween. The wire 234 has an essentially horizontal section 236 with crimps 238 and 240.

In operation, the wire 234 can simultaneously bow in response to vertical components of impact and compress at the crimps 238 and 240 in response to horizontal components of impact. The lateral wires 224 provide secondary impact dissipation. The gauge of the wire 234 can be selected for desired stiffness and crimped to accommodate the range of anticipated momenta and angles of impact.

Thus the present invention provides a crash panel that can be preprogrammed to absorb shock in an auto crash commensurate with the impacts predicted and the protection required for the automobile's occupants.

What is claimed is:

1. An energy absorbing panel assembly for mounting on a rigid member comprising a skeletal frame, a foam body molded over said frame, said frame comprising end brackets, spaced lateral members extending between said end brackets, said frame including intermediate resilient members extending between and attached to said lateral members so that said lateral members are resiliently retained in a spaced relationship, said intermediate members being constructed for collapsing movement in response to the application of an impact force to said body.

2. The energy absorbing panel that is defined in claim 1, wherein said intermediate resilient members comprise wire sections extending essentially perpendicular to said lateral members, each of said wire sections having a center portion which protrudes from a plane defined by said lateral members.

3. The energy absoring panel that is defined in claim 1 wherein said frame additionally comprises lateral wire elements extending between said end brackets at spaced positions intermediate said lateral members, said lateral wire elements being flexed to protrude from said plane and thus supportably engage said wire sections.

4. The energy absorbing panel that is defined in claim 2, wherein said wire sections have crimped portions to allow longitudinal collapse thereof.

5. The energy absorbing panel that is defined in claim 1, wherein said panel assembly additionally includes intermediate support brackets connected to and extending between said lateral members.

* * * * *